United States Patent
Humfeld et al.

(10) Patent No.: US 9,672,594 B2
(45) Date of Patent: Jun. 6, 2017

(54) MULTIPLE PIXEL PITCH SUPER RESOLUTION

(71) Applicant: The Boeing Company, Chicago, IL (US)

(72) Inventors: Keith D. Humfeld, Federal Way, WA (US); Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/519,839

(22) Filed: Oct. 21, 2014

(65) Prior Publication Data

US 2016/0110844 A1   Apr. 21, 2016

(51) Int. Cl.
*G06T 3/40* (2006.01)
*H04N 5/225* (2006.01)
*H04N 5/232* (2006.01)
*H04N 13/00* (2006.01)

(52) U.S. Cl.
CPC .......... *G06T 3/4053* (2013.01); *G06T 3/4069* (2013.01); *H04N 5/2258* (2013.01); *H04N 5/23232* (2013.01); *H04N 5/23245* (2013.01); *H04N 2013/0088* (2013.01)

(58) Field of Classification Search
CPC . G06T 3/4053; G06T 2200/32; G06T 3/4038; G06T 7/0024; H04N 5/2258; H04N 5/265; H04N 3/1593; H04N 5/3415; H04N 5/23238; H04N 5/23232; H04N 5/247; H04N 2013/0088; H04N 5/349; H04N 3/1587; B60R 2300/303; G03B 37/00; G03B 37/02; G03B 37/04; G08B 13/19628

See application file for complete search history.

(56) References Cited

U.S. PATENT DOCUMENTS

| | | | |
|---|---|---|---|
| 6,208,765 B1 | 3/2001 | Bergen | |
| 7,218,751 B2 | 5/2007 | Reed et al. | |
| 2005/0157294 A1* | 7/2005 | Hopkins | G02B 21/26 356/328 |
| 2006/0209201 A1 | 9/2006 | Spears et al. | |
| 2007/0133903 A1* | 6/2007 | Zomet | G06T 3/4053 382/299 |
| 2011/0228142 A1* | 9/2011 | Brueckner | H04N 5/3572 348/241 |
| 2012/0081519 A1* | 4/2012 | Goma | H04N 5/247 348/47 |

(Continued)

FOREIGN PATENT DOCUMENTS

EP    1418766 A2    5/2004

OTHER PUBLICATIONS

Search Report for related European Application No. EP15183725; report dated Feb. 16, 2016.

*Primary Examiner* — Mekonnen Dagnew
(74) *Attorney, Agent, or Firm* — Miller, Matthias & Hull LLP

(57) ABSTRACT

A camera system for producing super resolution images is disclosed. The camera system may include a target scene, a first detector configured to capture a first image of the target scene, and a second detector configured to capture a second image of the target scene. The first detector may include a first pitch, and the second detector may include a second pitch different from the first pitch.

20 Claims, 10 Drawing Sheets

(56) References Cited

U.S. PATENT DOCUMENTS

| | | | |
|---|---|---|---|
| 2012/0188389 A1* | 7/2012 | Lin | G06T 7/0065 |
| | | | 348/218.1 |
| 2012/0224085 A1 | 9/2012 | Al-Salem et al. | |
| 2012/0307111 A1 | 12/2012 | Miyakoshi | |
| 2013/0021447 A1* | 1/2013 | Brisedoux | H04N 5/2258 |
| | | | 348/47 |
| 2013/0208948 A1* | 8/2013 | Berkovich | G06T 7/0071 |
| | | | 382/103 |
| 2014/0078346 A1 | 3/2014 | Imade | |
| 2016/0019329 A1* | 1/2016 | Eldesouki | G06F 17/5072 |
| | | | 716/124 |

\* cited by examiner

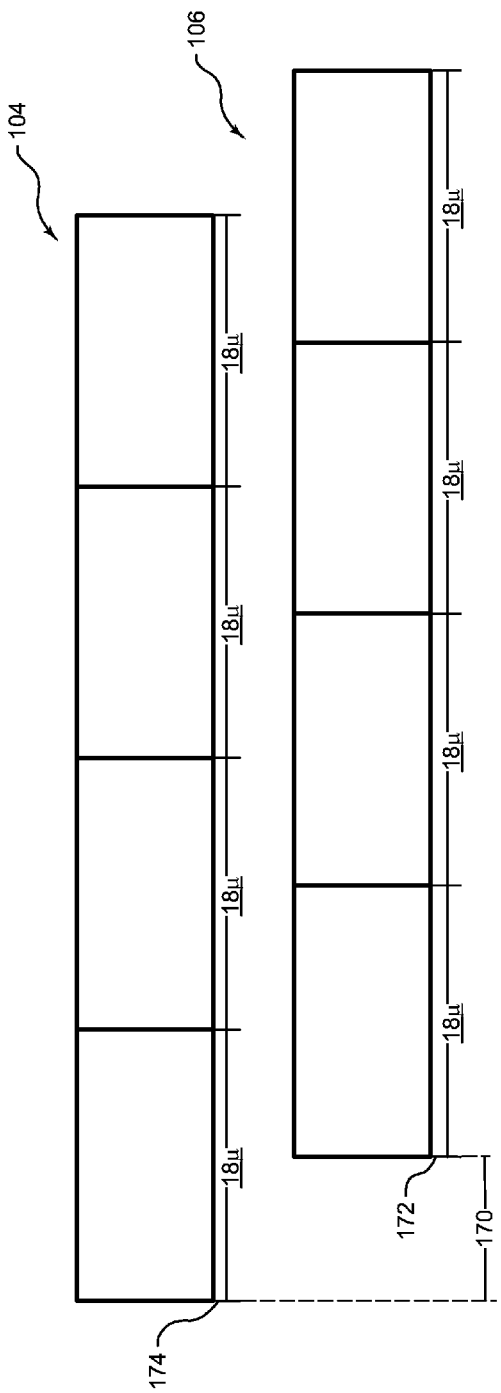
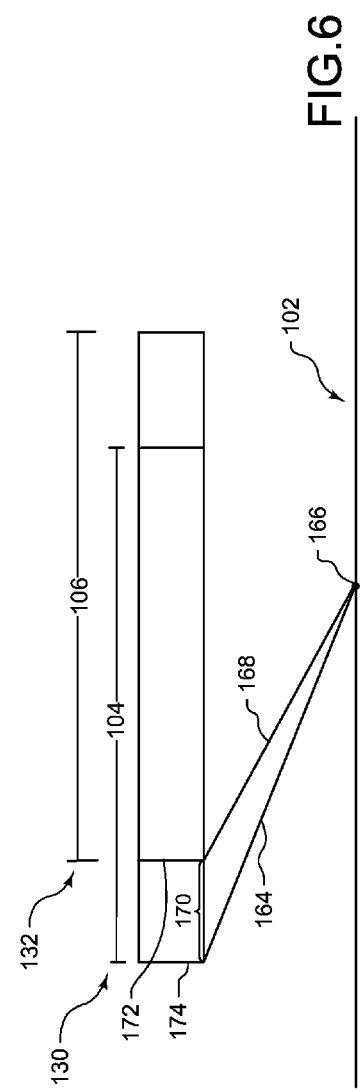

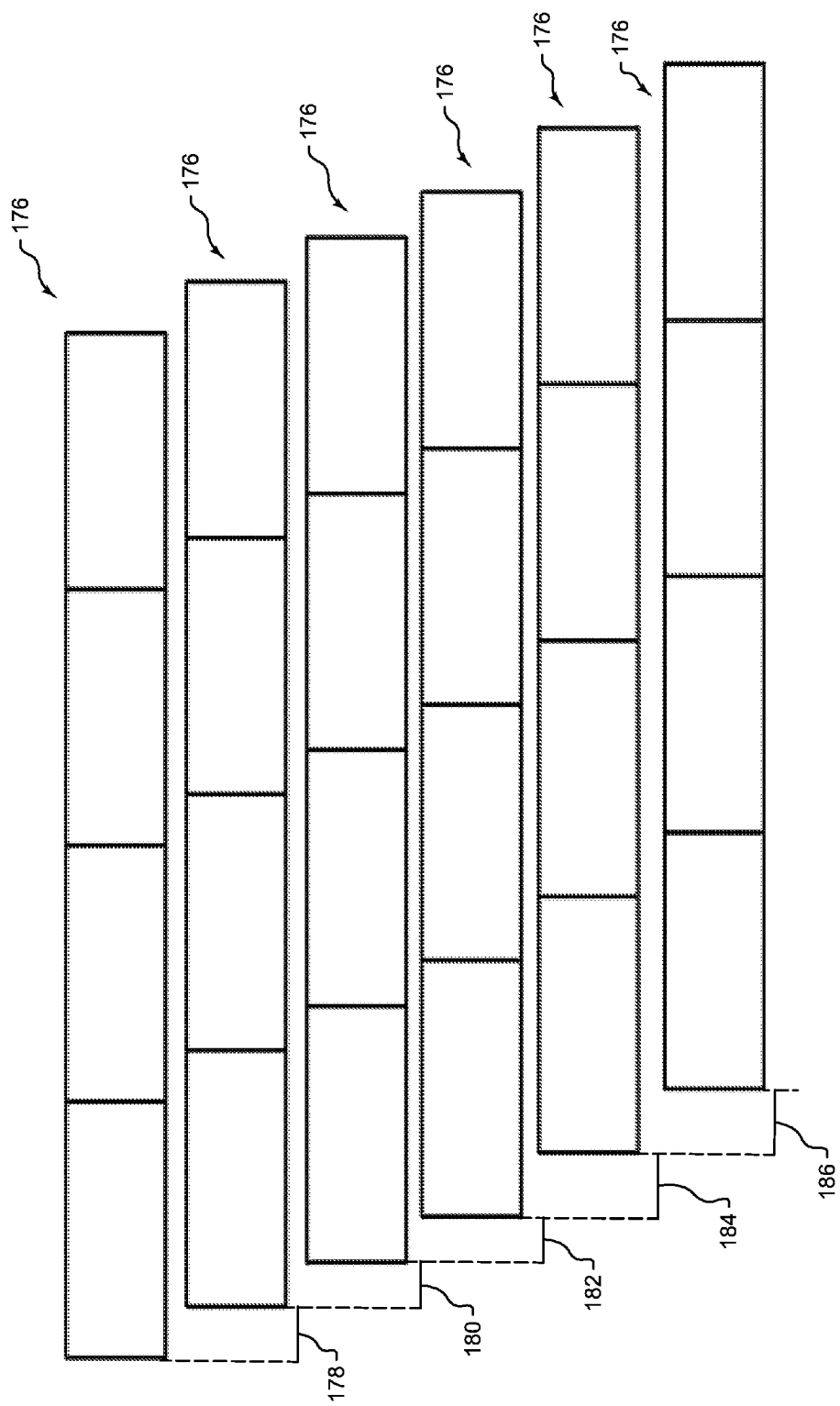

MULTIPLE PIXEL PITCH SUPER RESOLUTION

FIELD OF THE DISCLOSURE

The present disclosure relates generally to camera systems and, more particularly, to super resolution in camera systems and methods.

BACKGROUND OF THE DISCLOSURE

Camera systems are an important component of satellites, unmanned aerial vehicles (UAVs), and other surveillance platforms used for the purpose of intelligence, surveillance, and reconnaissance (ISR). Recently, technology to enhance resolution in camera systems has been integrated into an increasing number of applications for use in both military and civilian environments. The resolution enhancement technology may take shape in a variety of forms across these applications. For example, some technology is implemented via computer software, while other resolution enhancements may result from the physical optics used.

However, resolution enhancement technology may be limited in digital camera systems. In particular, a digital camera may capture a digital image by detecting photons received by a charge coupled device (CCD) or other photodetector array over a period of time. The resolution of standard CCD camera data is sorely limited by a size and count of individual pixels in the CCD camera.

SUMMARY OF THE DISCLOSURE

A computational technique called super resolution may be used to increase the resolution of the CCD camera beyond its physical limits With super resolution techniques, images of a higher resolution than the resolution of the originally captured image may be produced. More specifically, super resolution techniques compare numerous lower resolution images to one another and then statistically develop a higher resolution image from these lower resolution images.

In accordance with one embodiment, a camera system for producing super resolution images is disclosed. The camera system may include a target scene, a first detector configured to capture a first image of the target scene, and a second detector configured to capture a second image of the target scene. The first detector may include a first pitch, and the second detector may include a second pitch different from the first pitch.

In a refinement, the first pitch may be a first pixel size, and the second pitch may be a second pixel size.

In another refinement, the camera system may further include a first set of optics configured to focus light from the target scene onto a focal plane.

In another refinement, the camera system may further include a partial reflector configured to spread light from the target scene onto the first detector and the second detector. Each of the first detector and the second detector may use the first set of optics, and the first image and the second image may be captured at a same time.

In another refinement, the camera system may further include a second set of optics configured to focus light from the target scene onto the second detector, and the first set of optics may be configured to focus light from the target scene onto the first detector.

In another refinement, the target scene may be moving, the first detector and the second detector are stationary, and the second image may be captured at a different time than the first image.

In another refinement, the first detector and the second detector may be in motion, the target scene may be stationary, and the second image may be captured at a different time than the first image.

In another refinement, the camera system may further include a prism configured to refract light onto the first detector and the second detector.

In another refinement, the first detector and the second detector may be further configured to move relative to the prism.

In another refinement, the first pitch may include a position of the first detector relative to the target scene, the second pitch may include a position of the second detector relative to the target scene, and the first detector and the second detector may have a same pixel size.

In another refinement, the camera system may further include a processing unit configured to combine the first image and the second image into a single image.

In accordance with another embodiment, a method for producing a super resolution image is disclosed. The method may include capturing a first image of a target scene with a first detector array including a first pixel size, capturing a second image of the target scene with a second detector array including a second pixel size different from the first pixel size, and combining the first image and the second image into a single super resolution image.

In a refinement, the step of capturing a second image of the target scene with a second detector array including a second pixel size different from the first pixel size may further include capturing the second image at a same time as the first image is captured.

In another refinement, the method may further include using a partial reflector to spread light from the target scene onto the first detector array and the second detector array.

In another refinement, the step of capturing a second image of the target scene with a second detector array including a second pixel size different from the first pixel size may further include capturing the second image at a different time as the first image is captured.

In another refinement, the method may further include providing the target scene in motion relative to the first detector array and the second detector array, the first detector array and the second detector array being stationary.

In another refinement, the method may further include moving the first detector array and the second detector array relative to the target scene, the target scene being stationary.

In accordance with yet another embodiment, a method for producing a super resolution image is disclosed. The method may include capturing a first image of a target scene with a first detector array, capturing a second image of the target scene with a second detector array positioned at a predetermined offset from the first detector array, and combining the first image and the second image into a single super resolution image.

In a refinement, the method may further include providing the first detector array and the second detector array with a same pixel size.

In another refinement, the method may further comprise capturing a third image of the target scene with a third detector array of the same pixel size positioned at the predetermined offset from the second detector array, and wherein the step of combining the first image and the second image into a single super resolution image further comprises combining the first image, the second image, and the third image into the single super resolution image.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

BRIEF DESCRIPTION OF THE DRAWINGS

FIG. 5 is a diagrammatic view of a first detector array and a second detector array in accordance with another embodiment;

FIG. 6 is a plan view of the first detector array and the second detector array of FIG. 5 relative to a target scene;

FIG. 7 is a diagrammatic view of a plurality of detector arrays used to produce a single super resolution image, in accordance with another embodiment;

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
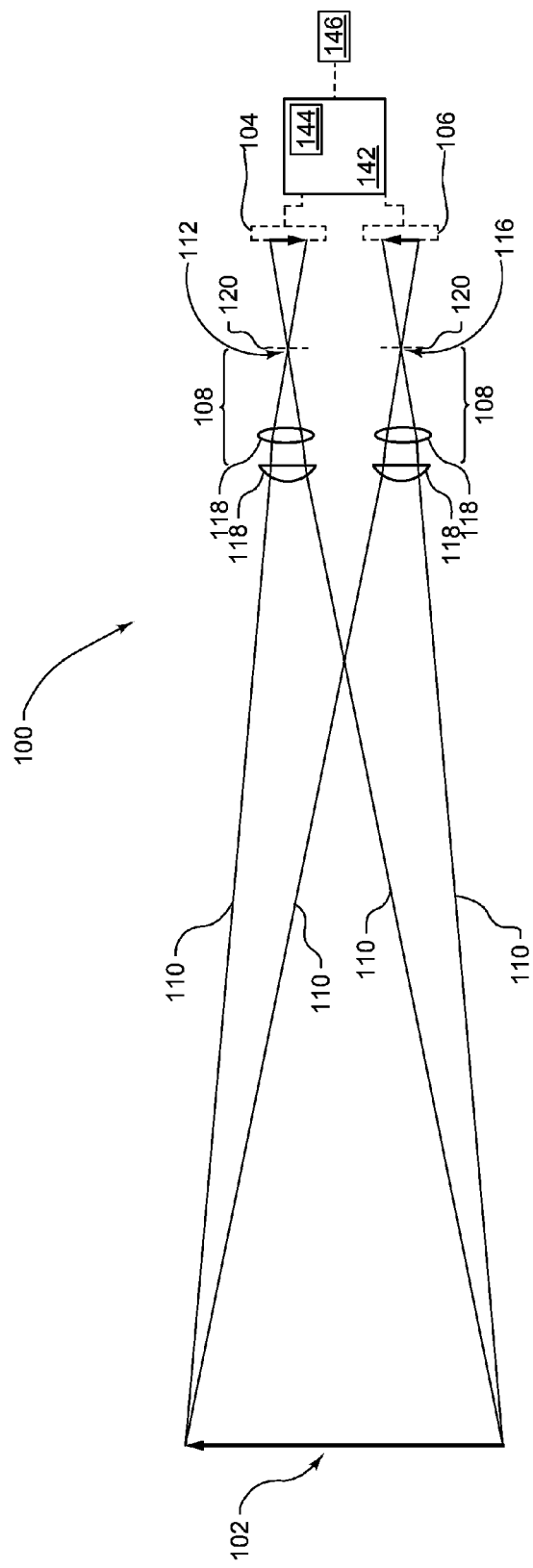
FIG. 1 is a schematic view of a camera system in accordance with one embodiment of the present disclosure.

FIG. 1 schematically illustrates a camera system 100 for producing super resolution digital images, in accordance with an embodiment of the present disclosure. With the camera system 100, a target scene 102 may be captured by a first detector array 104 and a second detector array 106. For example, a first set of optics 108 may focus light 110 from the target scene 102 onto a first focal plane 112, and a second set of optics 114 may focus light 110 from the target scene 102 onto a second focal plane 116. Each of the first set of optics 108 and the second set of optics 114 may include one or more lenses 118, an aperture 120, or other optical elements (not shown).

In this example, the first detector array 104 may be positioned at the first focal plane 112, and the second detector array 106 may be positioned at the second focal plane 116. Each of the first detector array 104 and the second detector array 106 may detect an intensity of the light 110 from the target scene 102. Furthermore, the first detector array 104 may be proximate to the second detector array 106. For example, the second detector array 106 may be positioned just below the first detector array 104, although other locations may be used. It is to be understood that camera system 100 may include more or less than two detector arrays 104, 106, as well as more or less than two sets of optics 108, 114.

Figure 2:
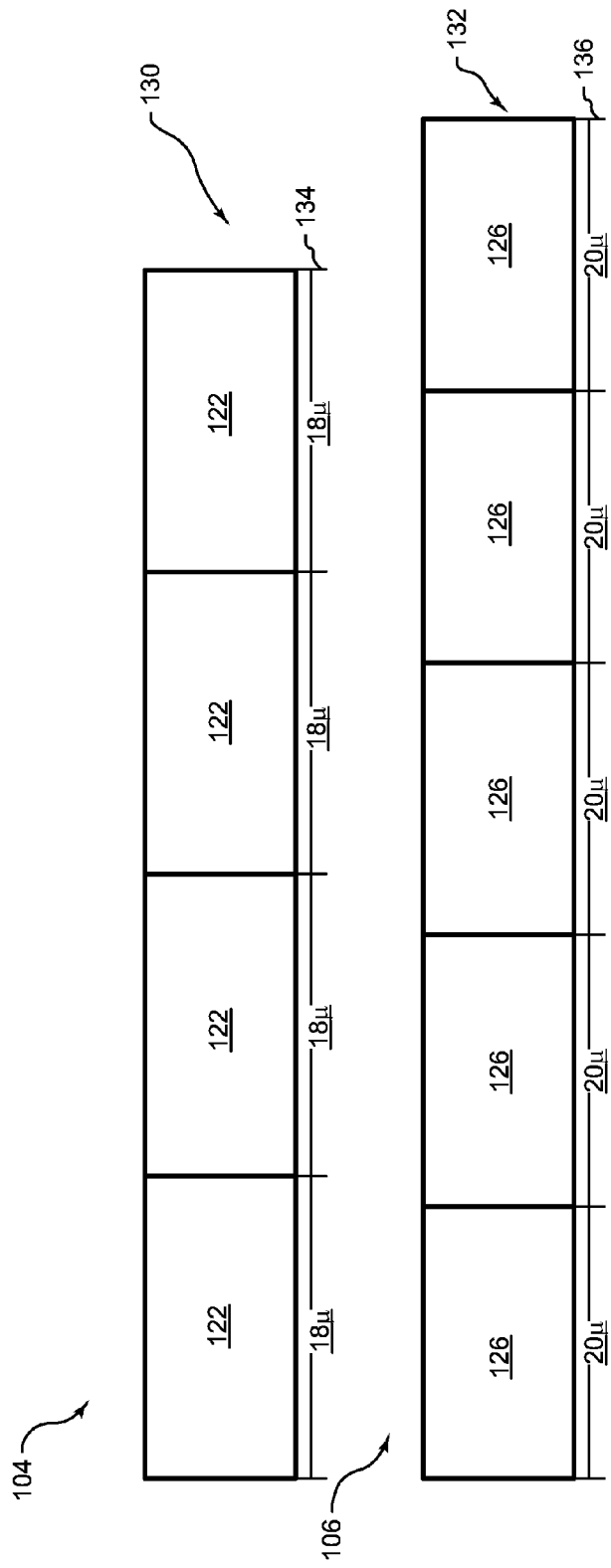
FIG. 2 is a diagrammatic view of a first detector array and a second detector array of the camera system of FIG. 1.
Figure 3:
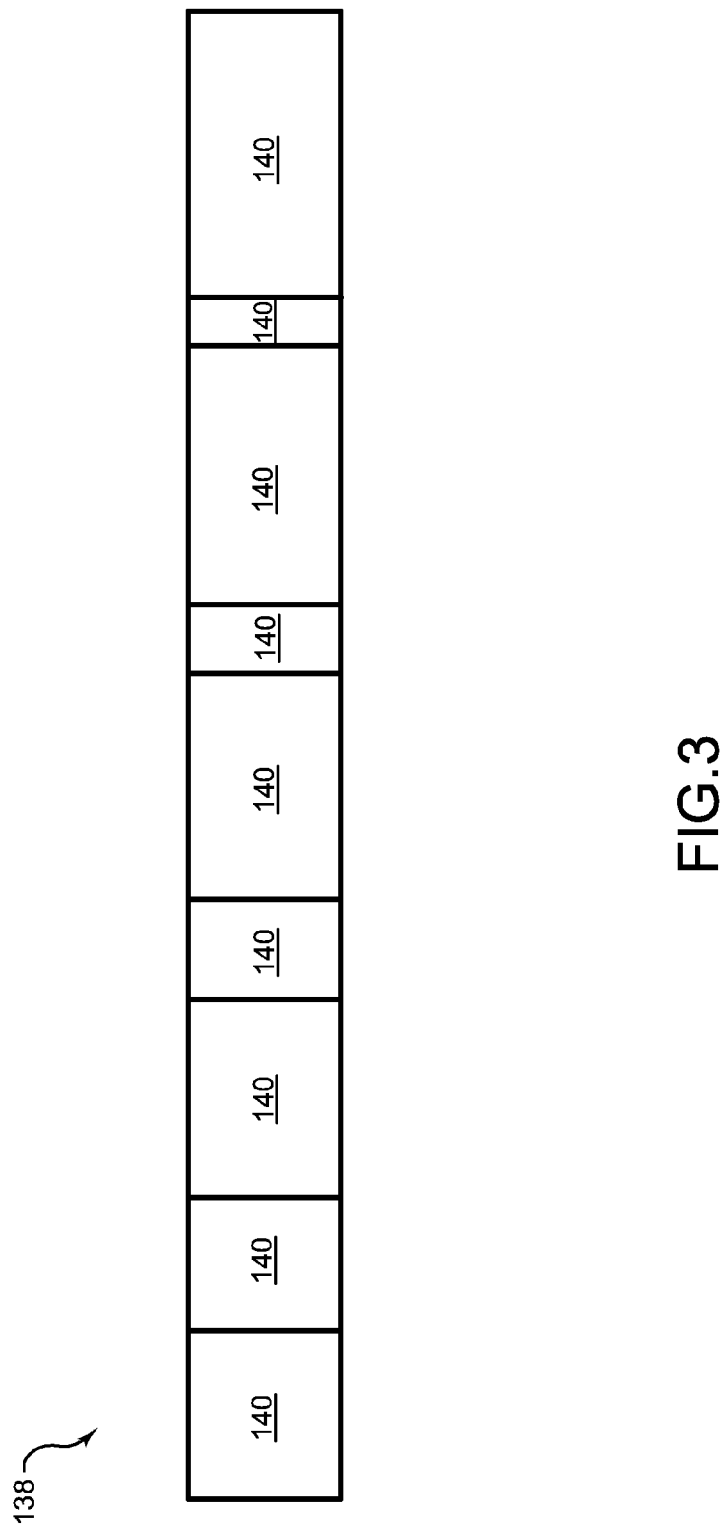
FIG. 3 is a diagrammatic view of a single super resolution image that resulted from the first detector array and the second detector array of FIG. 2.
Figure 4:
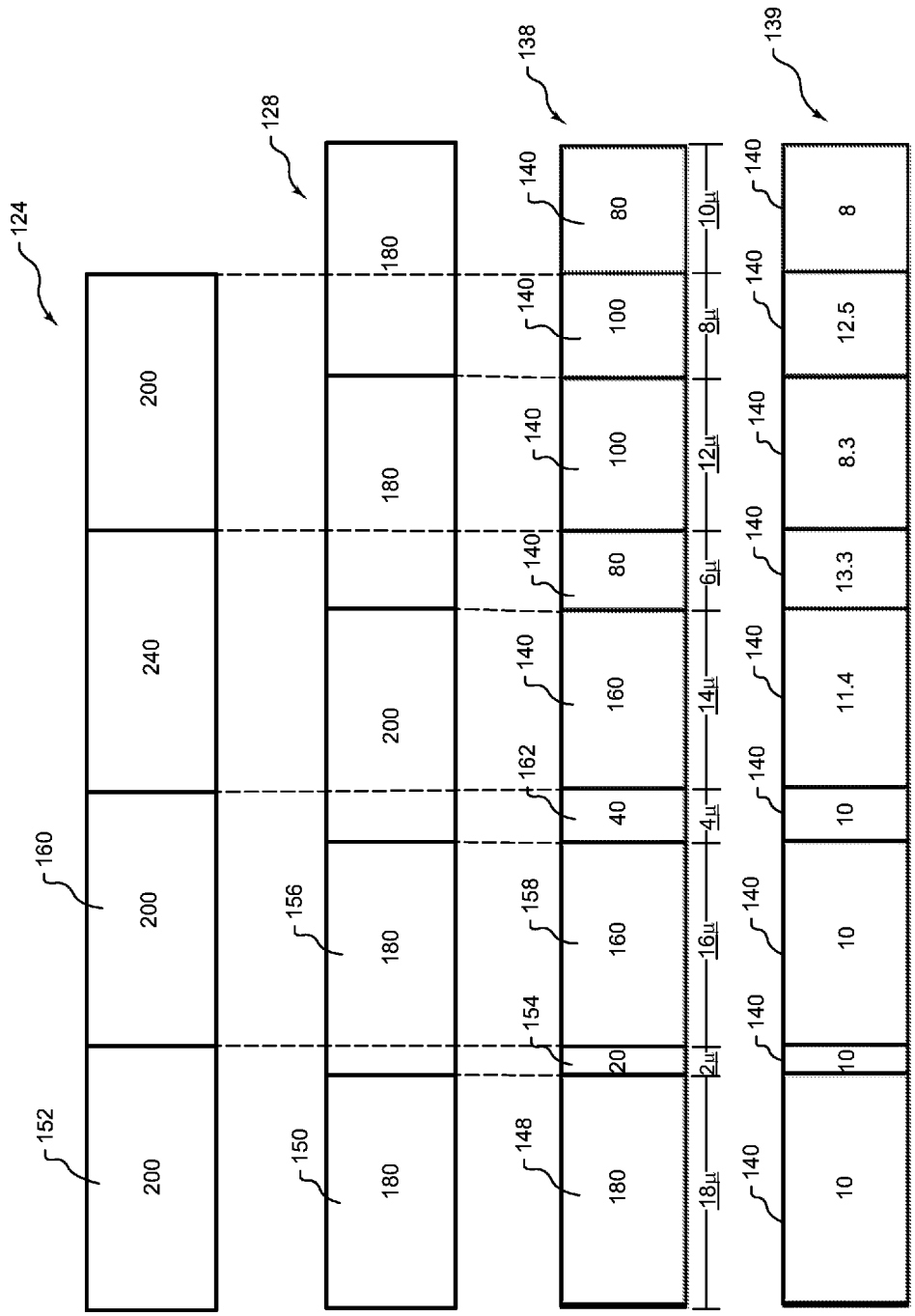
FIG. 4 is a diagrammatic view of a process for combining a first image from the first detector array of FIG. 2 and a second image from the second detector array of FIG. 2 in order to produce the single super resolution image of FIG. 3.

Referring now to FIG. 2-4, with continued reference to FIG. 1, the first detector array 104 may comprise an array of first detectors 122 and may be configured to capture a first image 124 of the target scene 102. Similarly, the second detector array 106 may comprise an array of second detectors 126 and may be configured to capture a second image 128 of the target scene 102. Each of the individual detectors 122, 126 may be configured to record image data. For example, each of the individual detectors 122, 126 may comprise a charge coupled device (CCD), a CMOS sensor, a CID sensor, or other image sensor. Each detector 122, 126 may measure and store the light intensity, or photon count per unit time, at its location.

In order to produce super resolution images, the camera system 100 may include a multiple pixel pitch. For example, the first detector array 104 may include a first pitch 130, and the second detector array 106 may include a second pitch 132 different from the first pitch 130. In the example of FIG. 2, the multiple pixel pitch may relate to multiple pixel sizes of the detector arrays 104, 106. For example, the first pitch 130 may relate to a first pixel size 134 of the first detector array 104, and the second pitch 132 may relate to a second pixel size 136 of the second detector array 106. The pixel size of a detector array may correspond to physical dimensions of the detector array, such as, but not limited to a width of an individual detector, a length of an individual detector, a height of an individual detector, a number of individual detectors, etc.

For instance, in FIG. 2, the first detector array 104 comprises a linear one-by-four (1×4) array of eighteen micron (18μ) width pixels, which is the first pixel size 134 of the first detectors 122. The second detector array 106 comprises a linear one-by-five (1×5) array of twenty micron (20μ) width pixels, which is the second pixel size 136 of the second detectors 126. However, it is to be understood, that the first and second detector arrays 104, 106 are not limited to such specific configurations and pixel sizes. Other configurations and dimensions for the first detector array 104, the first detectors 122, the second detector array 106, and the second detectors 126 may be used. Moreover, although only shown and described as being one-dimensional linear arrays, the first and second detector arrays 104, 106 may also be two-dimensional (m×n) arrays.

Due to the first pixel size 134 being different from the second pixel size 136, the first image 124 (FIG. 4) has a different resolution than the second image 128 (FIG. 4). By using two or more detector arrays 104, 106 with different pitches 130, 132, the camera system 100 may capture a plurality of images 124, 128 of the same target scene 102 that allow for super resolution enhancement. Combining the first and second images 124, 128 of different resolutions together produces a single super resolution image 138, shown in FIG. 3. More specifically, the photon counts captured from the first detector array 104 may be compared to the photon counts captured from the second detector array 106 in order to determine photon counts incident on sub-pixels 140 of the single image 138. The intensities from each of the sub-pixels 140 are then combined to produce the single super resolution image 138.

In addition, the camera system 100 may include a control unit 142 (FIG. 1) configured to control the first and second detector arrays 104, 106. The control unit 142 may comprise one or more processors, such as a "computer processor," or processor-based device that may include or be associated with a non-transitory computer readable storage medium having stored thereon computer-executable instructions. One or more algorithms may be programmed into a memory 144 (FIG. 1) associated with the control unit 142. The memory 144 may comprise a non-volatile memory. It is to be understood that the control unit 142 may include other hardware, software, firmware, and combinations thereof.

For example, the camera system 100 may include a multiple pixel pitch super resolution mode, or "super resolution mode", preprogrammed into the memory 144 of the control unit 142. When the camera system 100 is in super resolution mode, the control unit 142 may send signals to the first detector array 104 and the second detector array 106 to capture images 124, 128 of the target scene 102 at a same time. Furthermore, the camera system 100 may also include a processing unit 146 (FIG. 1) configured to combine the plurality of images into a single super resolution image.

The processing unit 146 may be integral to or separate from the control unit 142 of the camera system 100. In one example, the processing unit 146 may comprise a second processor associated with a second memory that is in communication with the control unit 142 and memory 144. For instance, the processing unit 146 may be included with the control unit 142. Alternatively, the processing unit 146 may be included on a separate component, such as, a personal computer (PC), used at a later time to process the plurality of images captured by the first and second detector arrays 104, 106.

The plurality of images may be combined by digitally composing a single super resolution image out of the plurality of images, such as, via mathematical computation. For instance, in FIG. 4, an example illustrating a technique of the processing unit 146 for combining the first and second images 124, 128 into the single image 138 is shown, in accordance with another embodiment. Each of the first detectors 122 in the first detector array 104 collects all the photons incident on its twenty micron (20μ) width, while each of the second detectors 126 in the second detector array 106 collects all the photons incident on its eighteen micron (18μ) width. Proceeding from left to right, the processing unit 146 may determine that a leftmost sub-pixel 148 of the single image 138 may have a same photon count of a leftmost detector 150 in the second image 128 since the sub-pixel 148 has a same eighteen micron (18μ) width as the leftmost detector 150.

The processing unit 146 may then compare photon counts between a leftmost detector 152 in the first image 124 and the leftmost detector 150 in the second image 128. More specifically, the processing unit 146 determines a difference between the two photon counts from the leftmost detector 152 in the first image 124 and the leftmost detector 150 in the second image 128 in order to determine a photon count of a two micron (2μ) width sub-pixel 154 of the single image 138. The photon count of the two micron (2μ) width sub-pixel 154 is equal to the number of photons that the leftmost twenty micron (20μ) width detector 152 collects but that the leftmost eighteen micron (18μ) width detector 150 does not collect.

Subsequently, the processing unit 146 may compare photon counts between the two micron (2μ) width sub-pixel 154 and a next eighteen micron (18μ) width detector 156 in the second image 128. By subtracting the photon count of the two micron (2μ) width sub-pixel 154 from the photon count of the next eighteen micron (18μ) width detector 156, a photon count of a sixteen micron (16μ) width sub-pixel 158 can be determined. Subtracting the photon count of the sixteen micron (16μ) width sub-pixel 158 from a next twenty micron (20μ) width detector 160 in the first image 124 determines a photon count of a four micron (4μ) width sub-pixel 162 of the single image 138.

The processing unit 146 may iteratively solve for the photon counts in the remaining sub-pixels 140 of the single image 138. Furthermore, the processing unit 146 may divide the photon count in each sub-pixel 140 by the area of that sub-pixel to determine an intensity for each sub-pixel, as shown in a duplicate image 139. In so doing, the camera system 100 produces the single image 138 with variable resolution enhancement. More specifically, a resolution of the single image 138 is variable in position and at least as fine as the finer pitch detector array 106. Furthermore, combining the first and second detector arrays 104, 106 with additional multiple pixel pitch detector arrays can greatly enhance a resolution of a combined image.

In another example, the multiple pixel pitch of the camera system 100 may refer to multiple pixel positions of the detector arrays relative to the target scene 102. As shown in FIGS. 5 and 6, with continued reference to FIGS. 1-4, the first pitch 130 may relate to a position 164 of the first detector array 104 relative to a center 166 of the target scene 102, and the second pitch 132 may relate to a position 168 of the second detector array 106 relative to the center 166 of the target scene 102. The position 168 of the second detector array 106 is different from the position 166 of the first detector array 104. However, in this example, the first detector array 104 and the second detector array 106 may have a same exact pixel size. For instance, each of the first and second detector arrays 104, 106 may comprise a linear one-by-four (1×4) array of eighteen micron (18μ) width pixels.

The second detector array 106 may be positioned at a predetermined offset 170 from the first detector array 104. More specifically, an edge 172 of the second detector array 106 may be distanced away from an edge 174 of the first detector array by the predetermined offset 170 such that the position 168 of the second detector array 106 is not the same as the position 164 of the first detector array 104 relative to the center 166 of the target scene 102. However, the first and second detector arrays 104, 106 may be offset in other ways relative to each other and the image 102. For example, the second detector array 106 may be positioned further away from the image 102, while the first detector array 104 is positioned at a closer distance to the image 102. The images of the target scene 102 captured by the first and second detector arrays 104, 106 may then be combined to produce a single super resolution image. For instance, the processing unit 146 may use a similar technique to that illustrated in FIG. 4.

Furthermore, as shown in FIG. 7, a plurality of detector arrays 176 of a same pixel size but variable pitch may be used to greatly enhance a resolution of a combined image. For example, the plurality of detector arrays 176 may be placed at predetermined offsets 178, 180, 182, 184, 186 from each other. The predetermined offsets 178, 180, 182, 184, 186 may comprise equal or variable distances. The plurality of detector arrays 176 may be configured to capture a plurality of images at a same time, and the plurality of images may then be combined to produce a super resolution image. It is to be understood that although each of the detector arrays 176 is shown as a one-dimensional linear array, each of the detector arrays 176 may also be two-dimensional (m×n) arrays.

It is to be understood that the target scene 102 may be either stationary or in motion relative to the first and second detector arrays 104, 106 when the first and second images 124, 128 are captured. Furthermore, the first detector array 104 may capture the first image 124 either at a same time as the second detector array 106 captures the second image 128 or at a different time as the second detector array 106 captures the second image 128. A same intensity across each of the first and second detector arrays 104, 106 may be warranted when capturing the images 124, 128 in motion and at different times.

In one example, the camera system 100 with multiple pixel pitch may be used in, but not limited to, inspection systems, such as, conveyor-based or free-fall-based food inspection applications, composite manufacturing, semiconductor fabrication, and the like. In this example, the target scene 102 may be in motion relative to stationary or fixed first and second detector arrays 104, 106, such as, a target scene on a conveyor belt or in free fall motion. The second detector array 106 may be positioned a predetermined distance away from the first detector array 104 in a line of motion of the target scene 102. In so doing, the second detector array 106 may capture the exact same target scene 102 as the first detector array 104 but at a different time. The second image 128 from the second detector array 106 may then be combined with the first image 124 of the first detector array 104 to produce the single super resolution image 138.

In another example, the camera system 100 with multiple pixel pitch may be used in, but not limited to, satellites, unmanned aerial vehicles (UAVs), and other surveillance platforms. In this example, the first and second detector arrays 104, 106 may be in motion relative to a stationary or fixed target scene 102. For instance, the first and second detector arrays 104, 106 may be mounted on a satellite or UAV that is moving past a stationary target scene 102. The second detector array 106 may be positioned a predetermined distance away from the first detector array 104 such that the second detector array 106 captures the exact same target scene 102 as the first detector array 104 but at a slightly different time as the satellite or UAV moves relative to the target scene 102. The second image 128 from the second detector array 106 may then be combined with the first image 124 of the first detector array 104 to produce the single super resolution image 138.

Figure 8:
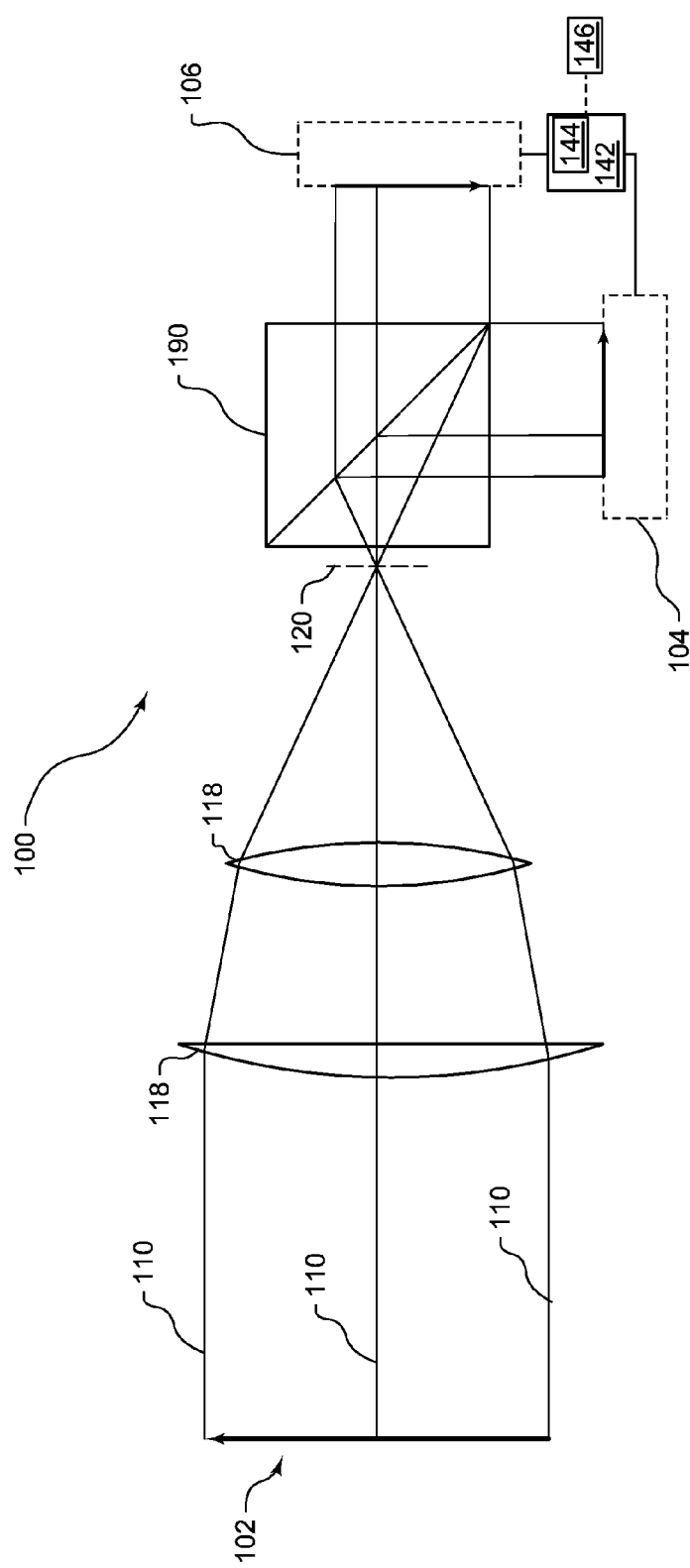
FIG. 8 is a schematic view of a camera system in accordance with another embodiment.

Turning now to FIG. 8, with continued reference to FIGS. 1-7, the camera system 100 with multiple pixel pitch may use only the first set of optics 108 to capture a plurality of images of the same target scene 102 at the same time, according to another embodiment. The first detector array 104 and the second detector array 106 may both capture the target scene 102 focused through the lenses 118 and aperture 120. In addition, the camera system 100 may further include a partial reflector 190, a lens, a beam splitter, a mirror, or other optical element configured to spread light 110 from the target scene 102 onto the first detector array 104 and the second detector array 106.

Using the same first set of optics 108 and the partial reflector 190, the first and second detector arrays 104, 106 may be configured to capture the first and second images 124, 128 at the same time. Furthermore, more than two detector arrays 104, 106 of multiple pixel pitch may be included in the camera system 100 in order to capture a plurality of images with multiple resolutions at the same time. The partial reflector 190 may be configured to spread light from the target image 102 into separate physical projections across the plurality of detector arrays. The plurality of images from the plurality of detector arrays can then be combined to produce a single image with super resolution enhancement.

Figure 9:
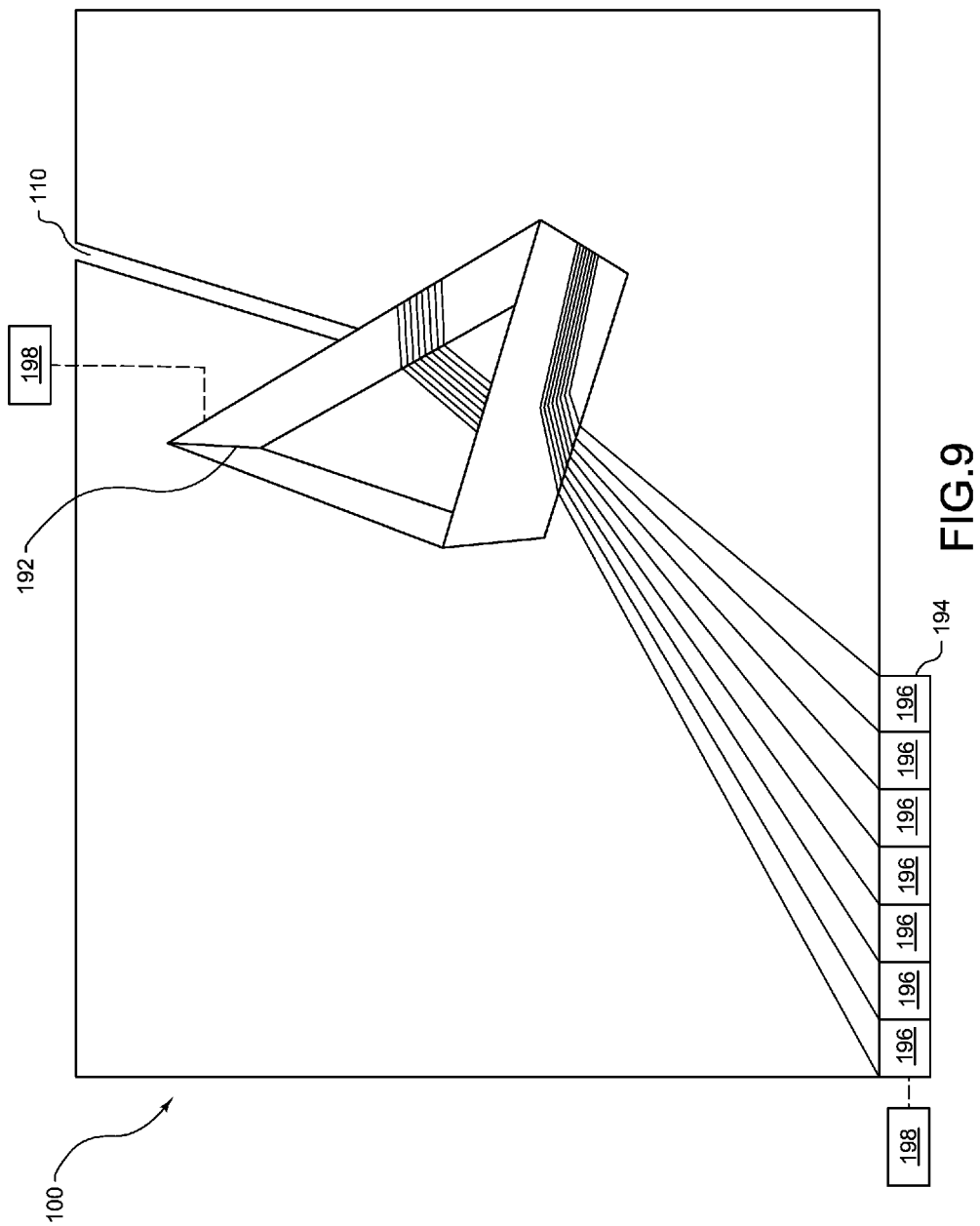
FIG. 9 is a schematic view of a camera system in accordance with yet another embodiment.

Referring now to FIG. 9, with continued reference to FIGS. 1-8, the camera system 100 may include a prism 192 configured to refract light 110 onto a detector array 194, such as in a hyperspectral imaging system. The prism 192, or other non-spherical lens element, may be used to spread light 110 from the target scene 102 to a plurality of detectors 196 in the detector array 194. Each of the detectors 196 in the detector array 194 may have a same pixel size. In this example, the multiple pixel pitch of the camera system 100 may refer to the different wavelengths of light separated by the prism 192 and detected by the detectors 196 in the detector array 194. Each of the individual detectors 196 detect different frequencies due to each detector 196 being at different positions relative to each other.

More specifically, the prism 192 is used to spread light from the target scene 102 such that each frequency or wavelength of light travels in a slightly different direction. Each of the detectors 196 in the detector array 194 then measures the intensity of light at each position and frequency. With various frequencies corresponding to different colors, the detector array 194 can detect the intensities of the different colors of light. All the intensities from each of the detectors 196 in the detector array 194 may then be combined to produce a single super resolution image. However, the resolution of the single image may be related to a size of the detectors 196, the intensity of the light, and a distance of the detectors 196 relative to the prism 192.

Furthermore, the detectors 196 and entire detector array 194 may be configured to move relative to the prism 192. For example, at least one transducer 198 may be coupled the detector array 194 and may be configured to move the detector array 194 relative to the prism 192. In another example, at least one transducer 198 may be coupled to the prism 192 and may be configured to move the prism 192 relative to the detector array 194. Other configurations for moving the detector array 194 and/or prism 192 may certainly be used.

By moving the detector array 194 further away from the prism 192, the detectors 196 detect wavelengths of the light that are more spread out in space, thereby increasing the resolution of the combined single image. Moreover, combining images taken at multiple distances from the prism 192 may have similar effects as combining images taken from detector arrays of multiple pixel sizes. Therefore, moving the detector array 194 towards and away from the prism 192 to predetermined locations and combining the images taken at the predetermined locations results in super resolution hyperspectral images.

For example, the detector array 194 may capture a first image taken at a first position relative to the prism 192. The detector array 194 or the prism 192 may be moved relative to each other to a second position that is different from the first position. For instance, the at least one transducer 198 may move the detector array 194 within the incident plane of the prism 192 to the second position. In one example, the detector array 194 in the second position may be closer to the prism 192 than in the first position. In another example, the detector array 194 in the second position may be further away from the prism 192 than in the first position. The detector array 194 then captures a second image at the second position. The first and second images are then combined into a single super resolution hyperspectral image. The detector array 194 or prism 192 may be moved relative to each other to various other positions in order to capture multiple images for hyperspectral super resolution.

INDUSTRIAL APPLICABILITY

In general, the foregoing disclosure finds utility in various applications relating to camera systems. In particular, the disclosed systems and techniques may be used to provide super resolution images in both optical and hyperspectral imaging systems. For example, the disclosed systems and techniques may be employed in, but not limited to, satellites, unmanned aerial vehicles (UAVs), and other surveillance platforms used for the purpose of intelligence, surveillance, and reconnaissance (ISR), and for other applications for use in both military and civilian environments. In another example, the disclosed systems and techniques may be employed in, but not limited to, inspection systems, such as, conveyor-based or free-fall-based food inspection applications, composite manufacturing, semiconductor fabrication, and the like.

By implementing the disclosed systems and techniques to digital camera systems, a cost-effective and efficient solution for improving resolution of an image is provided. The disclosed multiple pixel pitch super resolution mode may be easily implemented without significant expense. Furthermore, the multiple pixel pitch super resolution mode may be turned on or off depending on whether super resolution images are desired.

Figure 10:
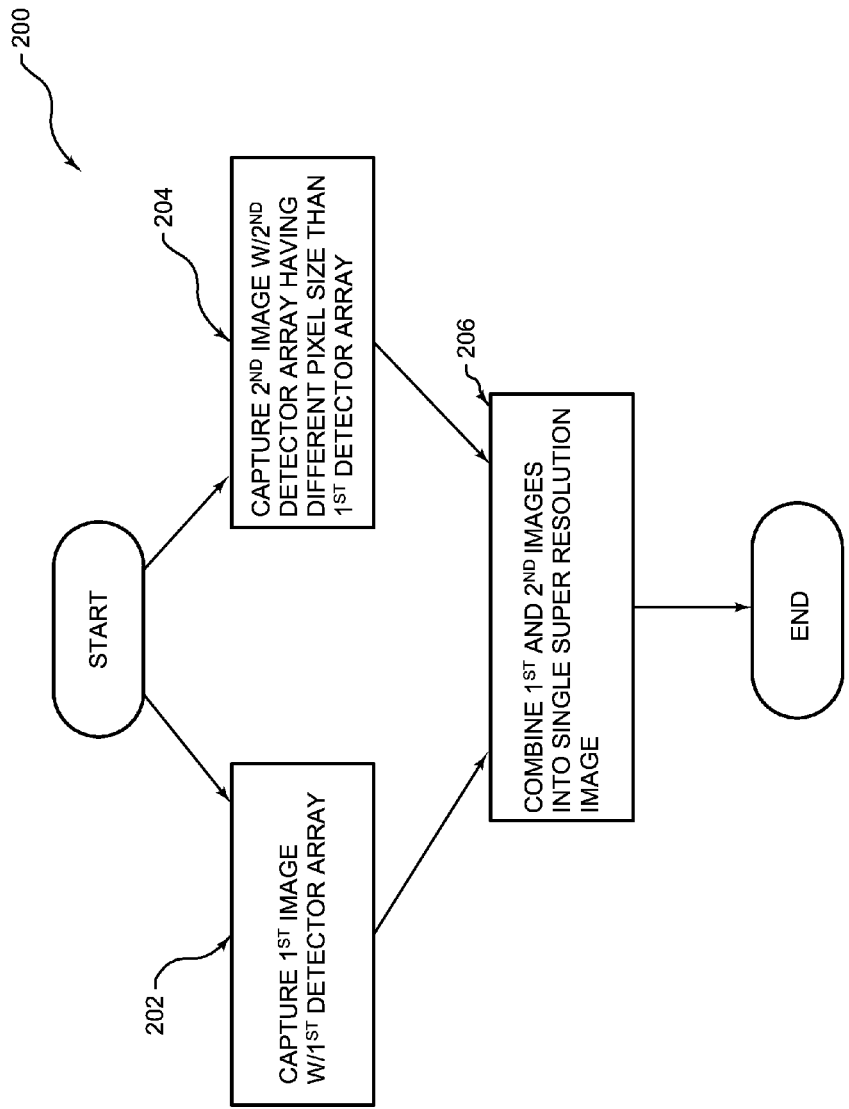
FIG. 10 is a flowchart illustrating a process for producing a super resolution image, in accordance with another embodiment.

Turning now to FIG. 10, with continued reference to FIGS. 1-9, a process 200 for producing a super resolution image is shown, in accordance with another embodiment of the present disclosure. At block 202, the first image of a target scene is captured with the first detector array including the first pixel size. At block 204, the second image of the target scene is captured with the second detector array including the second pixel size, which is different from the first pixel size of the first detector array. It is to be understood that blocks 202 and 204 may occur at a same or different time. At block 206, the first image and the second image are then combined into a single super resolution image. Although not shown, the process 200 may further include capturing more than two images using more than two detector arrays of various pixel sizes, and combining the plurality of images into the single super resolution image.

Figure 11:
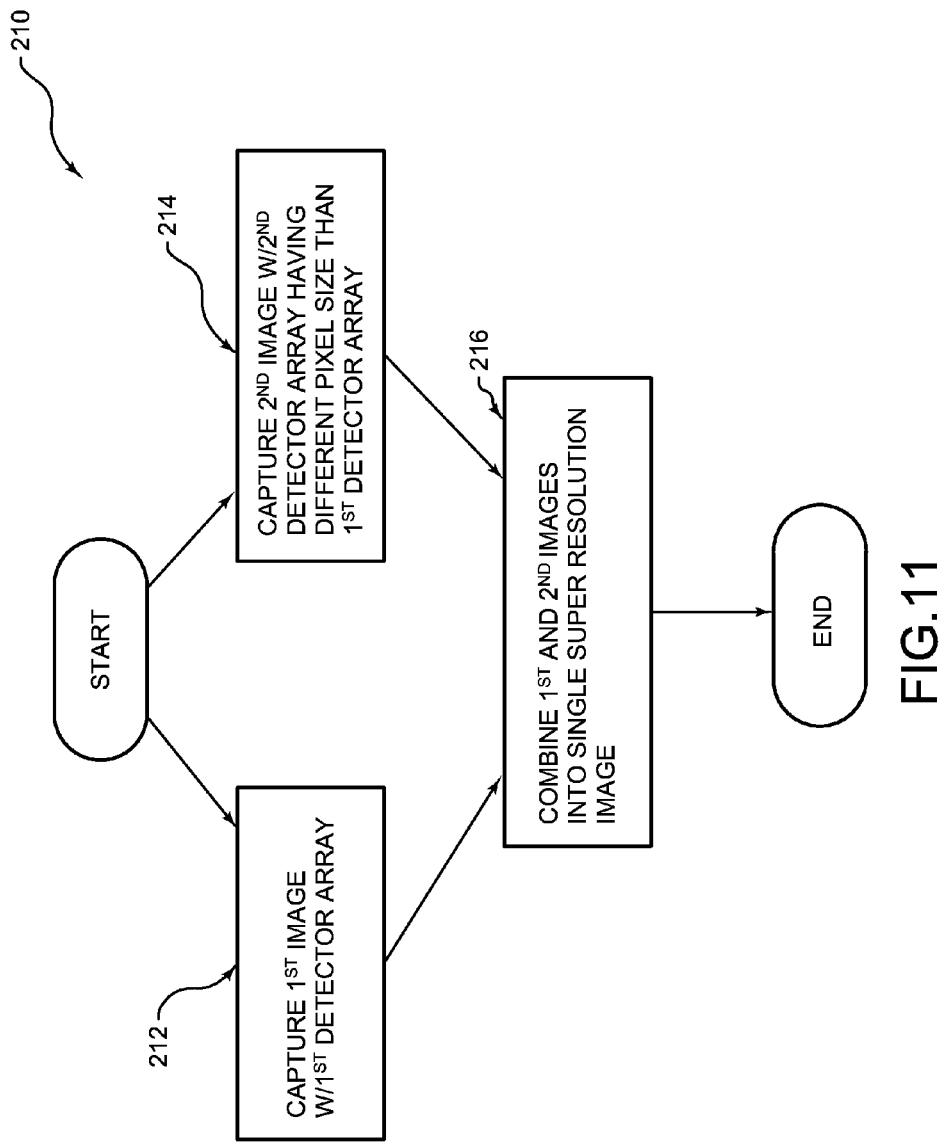
FIG. 11 is a flowchart illustrating another process for producing a super resolution image, in accordance with another embodiment.

Another process 210 for producing a super resolution image is shown in FIG. 11. At block 212, the first image of the target scene may be captured with the first detector array. At block 214, the second image of the target scene may be captured with the second detector array, which is positioned at a predetermined offset from the first detector array. The first detector array and the second detector array may have a same exact pixel size. It is to be understood that blocks 212 and 214 may occur at a same or different time. At block 216, the first image and the second image are combined into a single super resolution image.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A camera system for producing super resolution images, the camera system comprising:
    a target scene;
    a first detector configured to capture a first image of the target scene, the first detector including a first pitch;
    a second detector configured to capture a second image of the target scene, the second detector including a second pitch different from the first pitch;
    a prism configured to spread light from the target scene onto the first detector and the second detector such that each wavelength of light travels in a different direction; and
    a processing unit configured to combine the first image and the second image into a single image including sub-pixels by comparing the first pitch and a first photon count of the first detector with the second pitch and a second photon count of the second detector in order to determine a sub-pixel size and a sub-pixel photon count for each sub-pixel, and generating an intensity for each sub-pixel of the single image based on the sub-pixel size and the sub-pixel photon count, a resolution of the single image being related to a size of the first detector and the second detector, an intensity of the light spread from the target scene onto the first detector and the second detector by the prism, and a distance of the first detector and the second detector relative to the prism.

2. The camera system of claim 1, wherein the first pitch is a first pixel size, and the second pitch is a second pixel size.

3. The camera system of claim 2, further comprising a first set of optics configured to focus light from the target scene onto a focal plane.

4. The camera system of claim 3, further comprising a partial reflector configured to spread light from the target scene onto the first detector and the second detector, each of the first detector and the second detector using the first set of optics, the first image and the second image being captured at a same time.

5. The camera system of claim 3, further comprising a second set of optics configured to focus light from the target scene onto the second detector, the first set of optics configured to focus light from the target scene onto the first detector.

6. The camera system of claim 5, wherein the target scene is moving, the first detector and the second detector are stationary, and the second image is captured at a different time than the first image.

7. The camera system of claim 1, wherein the first detector and the second detector are in motion, the target scene is stationary, and the second image is captured at a different time than the first image.

8. The camera system of claim 1, wherein the first detector and the second detector are further configured to move relative to the prism.

9. The camera system of claim 1, wherein the first pitch comprises a position of the first detector relative to the target scene, the second pitch comprises a position of the second detector relative to the target scene, and the first detector and the second detector have a same pixel size.

10. The camera system of claim 1, wherein the camera system is a hyperspectral imaging system.

11. The camera system of claim 10, wherein each of the first detector and the second detector is configured to measure an intensity of the light at each position and frequency.

12. A method for producing a super resolution image, the method comprising:
   using a prism to spread light from a target scene onto a first detector and a second detector such that each wavelength of light travels in a different direction;
   capturing a first image of the target scene with the first detector array including a first pixel size;
   capturing a second image of the target scene with the second detector array including a second pixel size different from the first pixel size; and
   combining the first image and the second image into a single super resolution image including sub-pixels by comparing the first pixel size and a first photon count of the first detector with the second pixel size and a second photon count of the second detector in order to determine a sub-pixel size and a sub-pixel photon count for each sub-pixel, and generating an intensity for each sub-pixel of the single image based on the sub-pixel size and the sub-pixel photon count, a resolution of the single image being related to the first pixel size and the second pixel size, an intensity of the light spread from the target scene onto the first detector and the second detector by the prism, and a distance of the first detector and the second detector relative to the prism.

13. The method of claim 12, wherein the step of capturing a second image of the target scene with a second detector array including a second pixel size different from the first pixel size further comprises capturing the second image at a same time as the first image is captured.

14. The method of claim 13, further comprising using a partial reflector to spread light from the target scene onto the first detector array and the second detector array.

15. The method of claim 12, wherein the step of capturing a second image of the target scene with a second detector array including a second pixel size different from the first pixel size further comprises capturing the second image at a different time as the first image is captured.

16. The method of claim 15, further comprising providing the target scene in motion relative to the first detector array and the second detector array, the first detector array and the second detector array being stationary.

17. The method of claim 15, further comprising moving the first detector array and the second detector array relative to the target scene, the target scene being stationary.

18. A method for producing a super resolution image, the method comprising:
   using a prism to spread light from a target scene onto a first detector array and a second detector array such that each wavelength of light travels in a different direction;
   capturing a first image of the target scene with the first detector array;
   capturing a second image of the target scene with the second detector array positioned at a predetermined offset from the first detector array; and
   combining the first image and the second image into a single super resolution image including sub-pixels by comparing a first position and a first photon count of the first detector array with a second position and a second photon count of the second detector array in order to determine a sub-pixel size and a sub-pixel photon count for each sub-pixel, and generating an intensity for each sub-pixel of the single image based on the sub-pixel size and the sub-pixel photon count, a resolution of the single image being related to a size of the first detector array and the second detector array, an intensity of the light spread from the target scene onto the first detector array and the second detector array by the prism, and a distance of the first detector array and the second detector array relative to the prism.

19. The method of claim 18, further comprising providing the first detector array and the second detector array with a same pixel size.

20. The method of claim 19, further comprising capturing a third image of the target scene with a third detector array of the same pixel size positioned at the predetermined offset from the second detector array, and wherein the step of combining the first image and the second image into a single super resolution image further comprises combining the first image, the second image, and the third image into the single super resolution image.

* * * * *